United States Patent
Mohr et al.

(10) Patent No.: US 6,209,583 B1
(45) Date of Patent: *Apr. 3, 2001

(54) PRESSURE ACCUMULATOR

(75) Inventors: Kurt Mohr, Halsenbach/Ehr; Karl-Friedrich Wörsdörfer, Budenheim; Gregor Poertzgen, Koblenz, all of (DE)

(73) Assignee: Lucas Industries public limited company (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/549,297

(22) Filed: Apr. 14, 2000

Related U.S. Application Data

(62) Division of application No. 09/137,795, filed on Aug. 21, 1998, now Pat. No. 6,076,558, which is a continuation of application No. PCT/EP97/02782, filed on May 28, 1997.

(30) Foreign Application Priority Data

May 30, 1996 (DE) ............................................... 196 21 786

(51) Int. Cl.⁷ .................................................... F16L 55/04
(52) U.S. Cl. ................................. 138/30; 138/26; 220/721
(58) Field of Search ........................ 138/30, 26; 220/721, 220/720, 723; 303/113.2–113.4, 115.4

(56) References Cited

U.S. PATENT DOCUMENTS

| | | | |
|---|---|---|---|
| 1,830,869 | 11/1931 | Charles | 138/30 |
| 1,916,635 | 7/1933 | Pepper | 138/30 X |
| 1,932,666 | 10/1933 | Hyatt | 138/30 |
| 2,809,665 | 10/1957 | Crowe | 138/30 |
| 2,847,035 | 8/1958 | Peters | 138/30 |
| 3,415,277 | 12/1968 | Mitchell et al. | 138/30 X |
| 4,064,911 | 12/1977 | Albrecht | 138/30 |
| 4,813,477 | 3/1989 | Hansen et al. | 138/30 X |
| 4,858,898 | 8/1989 | Niikura et al. | 138/30 X |
| 4,880,147 | 11/1989 | Tolan | 138/30 X |
| 4,997,009 | 3/1991 | Niikura et al. | 138/30 |
| 5,655,569 | 8/1997 | Tackett | 138/30 |
| 5,682,923 | 11/1997 | Goloff et al. | 138/30 |
| 6,012,491 | 1/2000 | Mohr | 138/30 |
| 6,076,558 | * 6/2000 | Mohr et al. | 138/30 |

FOREIGN PATENT DOCUMENTS

| | | | |
|---|---|---|---|
| 1756722 | * 8/1970 | (DE) | 138/30 |
| 3807316 | * 4/1989 | (DE) | 138/30 |
| 3900899 | 7/1989 | (DE) . | |
| 3901261 | 7/1990 | (DE) . | |
| 0391320 | 10/1990 | (EP) . | |
| 1190138 | * 11/1985 | (SU) | 138/30 |

* cited by examiner

Primary Examiner—Patrick Brinson
(74) Attorney, Agent, or Firm—MacMillan, Sobanski & Todd, LLC

(57) ABSTRACT

The invention relates to a pressure accumulator which may be used in an electronically controllable vehicle braking system for a motor vehicle. In an electronically controllable vehicle braking system with a cylinder/piston arrangement (i.e., a master cylinder) providing a brake fluid, a brake pedal actuates the cylinder/piston arrangement to provide brake fluid acting on the brake of the motor vehicle. The cylinder/piston arrangement is connectable with a pump arrangement and the pressure accumulator.

20 Claims, 4 Drawing Sheets

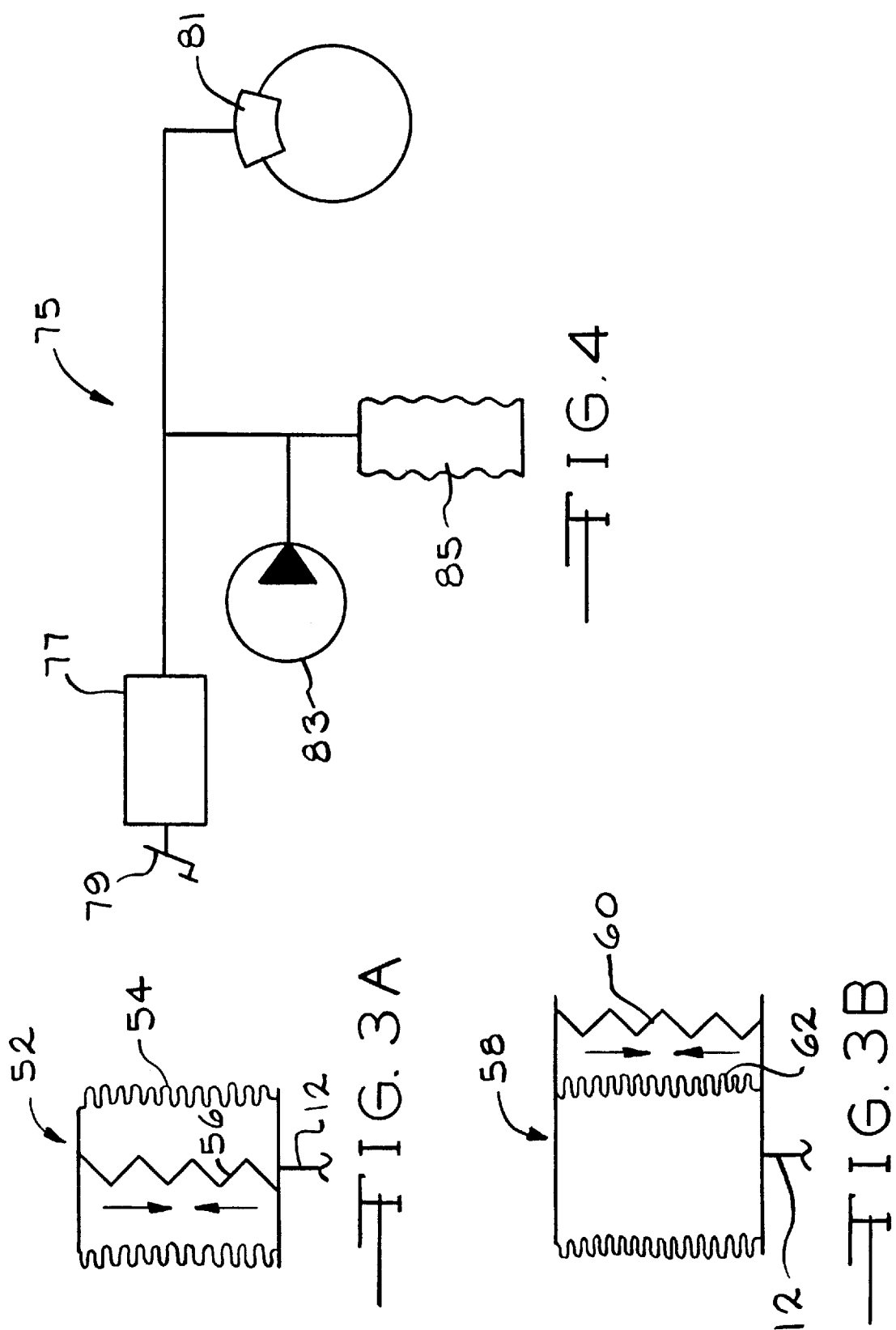

PRESSURE ACCUMULATOR

CROSS-REFERENCES TO RELATED APPLICATIONS

This application is a divisional of U.S. patent application Ser. No. 09/137,795, now U.S. Pat. No. 6,076,558 entitled 'ELECTRONICALLY CONTROLLABLE VEHICLE BRAKING SYSTEM FOR A MOTOR VEHICLE,' filed Aug. 21, 1998, in the name of K. Mohr et al., the disclosure of which is incorporated herein by reference and which is a continuation of copending International Application PCT/EP97/02782 filed on May 28, 1997, and which designated the U.S., the disclosure of which is incorporated herein by reference, and which claimed priority to German Application DE 196 21 786.5 filed on May 30, 1996.

BACKGROUND OF THE INVENTION

The present invention relates to an electronically controllable vehicle braking system for a motor vehicle with a cylinder/piston arrangement providing a brake fluid, which, by actuating a brake pedal, is caused to provide brake fluid acting on the brake of the motor vehicle, with the cylinder/piston arrangement being connectable with a pump arrangement and a pressure accumulator with the pressure accumulator having a housing which comprises a fluid connection for a fluid flowing into and out of the housing as well as a spring arrangement against whose force brake fluid flowing through the fluid connection is acting, characterised in that at least one part of the spring arrangement is formed by at least one part of the housing wall.

The invention also relates to a pressure accumulator, in particular for such an electronically controllable vehicle braking system. comprising a housing, a fluid connection for fluid flowing into and out of the housing, as well as a spring arrangement against whose force brake fluid flowing in through the fluid connection is acting.

From the state of the art pressure accumulators are known which are designed as gas piston accumulators, as gas diaphragm accumulators or as gas multilayer diaphragm accumulators or as spring piston accumulators. Such pressure accumulators are schematically depicted in FIGS. 1a, 1b, 1c and 1d, respectively. In the variants shown in FIGS. 1a to 1d the usable volume at 20° C. is identical. As is apparent, the respective size varies considerably. In addition, problems exist in the case of gas-filled pressure accumulators with respect to the temperature dependency and the tightness over the endurance performance. In the case of gas multilayer diaphragm accumulators, further drawbacks are their considerable weight and high costs. In the case of spring piston accumulators the problem exists in the wear of the seal between the cylinder and the piston.

BRIEF DESCRIPTION OF THE INVENTION

The invention is based on the object to provide a pressure accumulator, in particular for the initially mentioned vehicle braking system, which does not have these drawbacks.

In order to solve this problem, at least one part of the spring arrangement is formed by at least one part of the housing wall.

In this manner, a considerable weight saving is achieved on the one hand. On the other hand, the integration of two functions (storage of potential energy and enclosing of the fluid) in a single component enables a considerable simplification of the overall arrangement. Moreover, seals which can wear due to friction are avoided.

The part of the spring arrangement which forms a part of the housing wall is preferably at least sectionally formed by bellows, preferably consisting of metal.

In order to obtain a pressure level which is as high as possible, a further part of the spring arrangement acts parallel to the spring arrangement which is formed by a part of the housing wall, which is preferably arranged inside the housing. This further part of the spring arrangement can be designed as a coil, elastomer or spiral spring or as a disk spring pack. There is also, however, the possibility to arrange the further part of the spring arrangement outside of the housing, for example, surrounding the housing.

The further part of the spring arrangement is preferably formed by a spring element which pulls two rigid wall sections of the housing towards each other. For this purpose, the spring element is preferably designed as a compression spring. It is, however, also possible to design the spring element as a tension spring. If the spring element is designed as a compression spring, it is preferably clamped between a first housing wall and an intermediate wall which is connected with a second housing wall. The spring element thereby bears against the first housing wall via a bolt whose effective length is adjustable and which protrudes through the intermediate wall. Thereby, the intermediate wall is part of a sleeve which is connected with the second housing wall.

Further advantages, properties and possible modifications will become apparent from the following description of the figures.

BRIEF DESCRIPTION OF THE DRAWINGS

FIG. 3a is a schematic representation of an embodiment of an vehicle braking system pressure accumulator according to the invention, with a tension spring internal to the housing.

FIG. 3b is a view similar to FIG. 3a, except schematically illustrating the tension spring outside the housing.

FIG. 4 is a simplified schematic representation of an electronically controllable brake system according to the invention.

DETAILED DESCRIPTION OF THE INVENTION

Figure 1C:
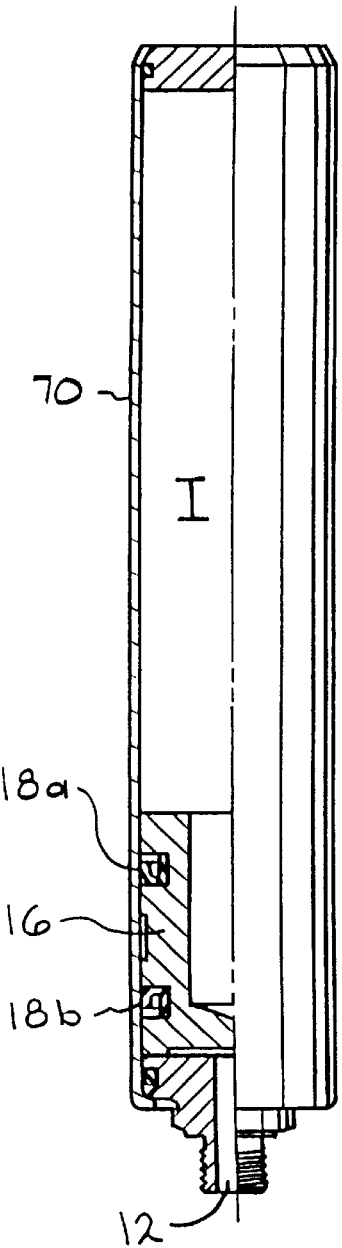
FIGS. 1a to 1d show different pressure accumulator variants according to the state of the art.
Figure 1A:
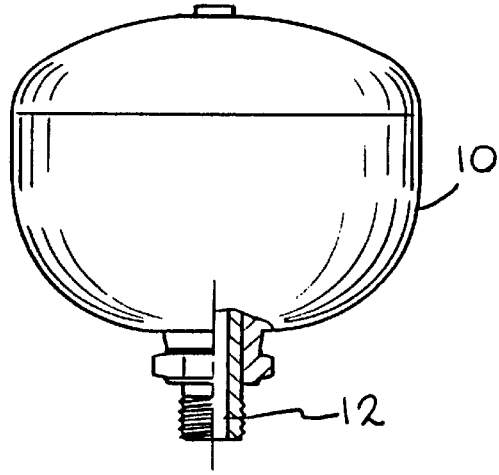

FIG. 1a shows a gas accumulator with a housing 10 which is divided into two compartments by a movable diaphragm (not shown). A first completely enclosed compartment I contains pressurised gas. A second compartment II can be subjected with pressurised fluid through a fluid connection. As soon as the pressure of the fluid applied to the fluid connection 12 is higher than the gas pressure in the first completely enclosed compartment I, the diaphragm is displaced so that this first compartment I is reduced in size and the fluid penetrates into the second compartment II.

Figure 1B:
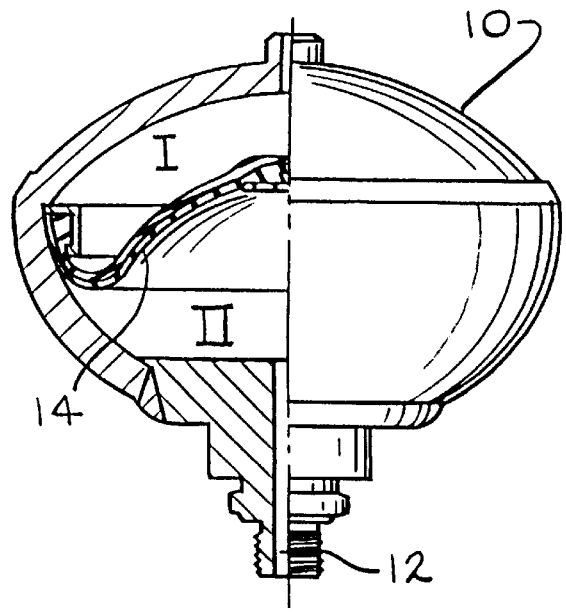

FIG. 1b shows a known pressure accumulator wherein the diaphragm is designed as a multilayer diaphragm 14. This multilayer diaphragm 14, however, is very expensive. However, it is able to at most double the life of the arrangement compared to an arrangement with a single-layer diaphragm.

The problems with respect to the temperature dependency are not solved therewith.

FIG. 1c shows a gas piston accumulator wherein a piston 16 is arranged in an axially movable manner within a cylinder which simultaneously forms the housing wall 10. The piston 16 encloses a compartment I which is filled with pressurised gas in the same manner as with the diaphragm 14. The problem with this arrangement is that under continuous operation the seals 18a, 18b are subject to the risk of wear and ageing. Moreover, in this case too, there is the problem of the temperature dependency due to the gas filling of the first compartment I.

Figure 1D:
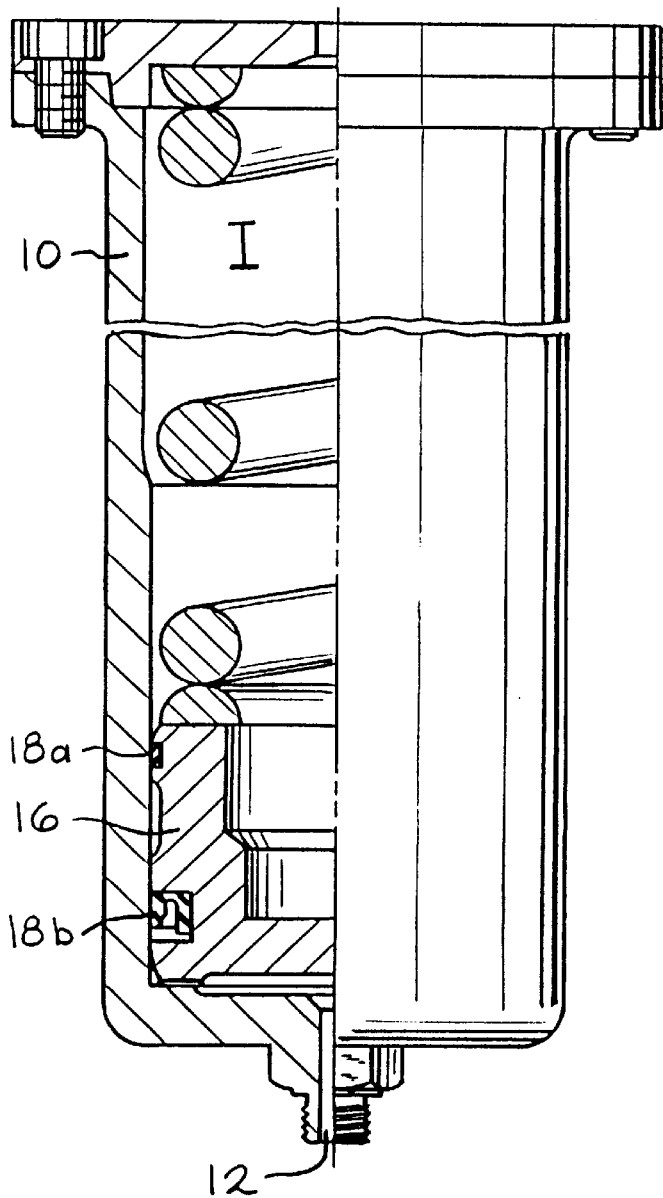

FIG. 1d shows a spring piston accumulator wherein a coil spring 20 is arranged in lieu of the gas filling which bears on the piston 16. This, in fact, solves the problem of the temperature dependency. However, the problem of ageing and wear of the seals 18a, 18b still exists.

In addition, the drawings clearly show the considerable space requirement of the spring piston according to FIG. 1d, for example, as compared to the gas accumulator according to FIG. 1a.

Figure 1E:
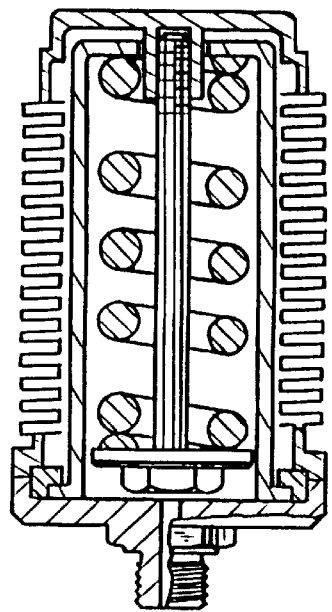
FIG. 1e shows an embodiment of the inventive pressure accumulator in a size comparison to scale with the known arrangements according to FIGS. 1a to 1d.

Surprisingly, the inventive design makes it possible to achieve a space requirement which is only negligbly above the space requirement of the gas pressure accumulator according to FIG. 1a, with identical storage volumes for brake fluid being assumed. This is illustrated by the size comparison to scale between FIGS. 1a to 1d on the one hand and FIG. 1e (inventive pressure accumulator) on the other hand.

Nevertheless, the inventive pressure accumulator is not (or) hardly temperature-dependent and, due to the lack of moving seals, has no wear problems.

Figure 2:
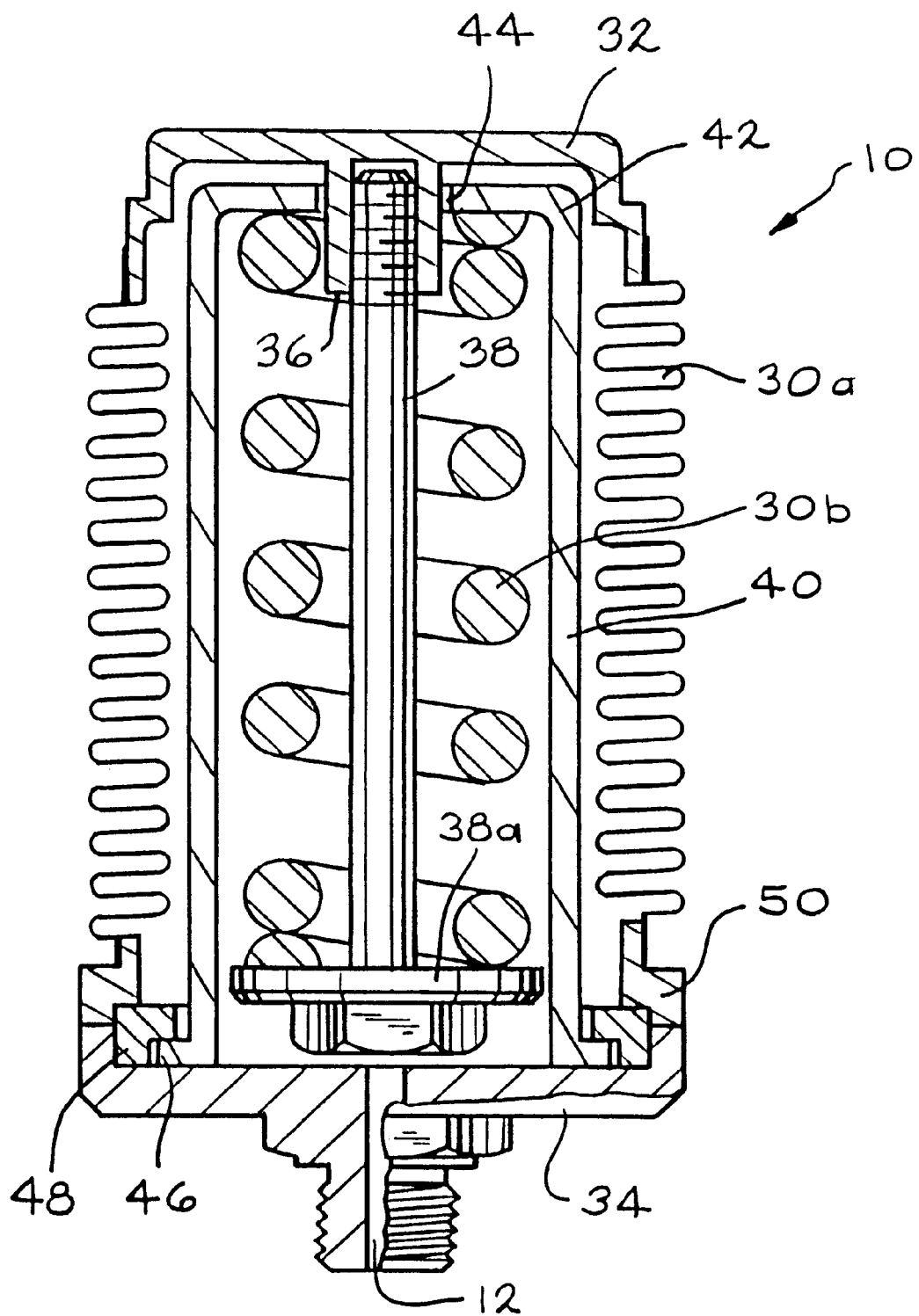
FIG. 2 shows an inventive pressure accumulator as an enlarged schematic representation.

FIG. 2 shows an embodiment of an inventive pressure accumulator with a housing 10, a fluid connection 12 for fluid flowing into and out of the housing 10 and a spring arrangement 30a, 30b, against whose force brake fluid flowing through the fluid connection acts. One part of the spring arrangement 30a, 30b is formed by a part of the housing wall of the housing 10. This part of the spring arrangement 30a, which forms a part of the housing wall, is formed by metal bellows. Inside the housing, a further part of the spring arrangement, i.e. the coil spring 30b, is connected so as to act parallel to same.

The housing 10 comprises two rigid wall sections 32, 34 which in the shown embodiment close the end faces of the cylindrical bellows. The fluid connection 12 is provided in the one wall section 34.

The two wall sections 32, 34 are firmly and pressure-tightly connected with both ends of the metal bellows 30a so that a totally closed compartment is obtained. The first rigid housing wall 32 is provided with a threaded flange 36 at its inside, into which a threaded bolt 38 is screwed. A tubular sleeve 40 bears against the second housing wall, whose axial length is dimensioned in such a manner that it essentially overlaps the entire space between the first and the second housing wall 32, 34. At its side facing towards the first housing wall 32 the sleeve 40 comprises a cover which serves as an intermediate wall 42 through which the threaded flange 26 protrudes so that it forms an annular gap 44. The spring element 30b is accommodated as a biased compression spring between the intermediate wall 42 and a head 38a of the threaded bolt 38. The bias of the spring element 30 can be adjusted by means of the threaded bolt 38.

At its side facing towards the second housing wall 34 the sleeve 40 comprises an outwardly facing annular collar 46 which is accommodated via a retaining ring 48 in the circumferential rim 50 of the second housing cover 34.

For installation, a preassembled unit consisting of the first housing wall 32 and the bellows 30a is inserted into the sleeve 40 (with the retaining ring 48) and the spring 30b fitted. The spring 30b is urged against the intermediate wall 42 by means of the threaded bolt 38. Subsequently, the second housing cover 34 is welded to the rim element 50 so that they form a strong connection capable of being subjected to pressure.

The spring element in the vehicle braking system pressure accumulator is preferably designed as a compression spring, that is a spring which is placed under compression as the brake fluid flows into the accumulator. This is the case with the embodiment of the invention illustrated in FIG. 2 and described above. It is, however, also possible to design the spring element as a tension spring, that is, with a spring element that is placed in tension when brake fluid flows into the accumulator. This is illustrated in FIG. 3a, in which a vehicle braking system pressure accumulator is generally indicated at 52. The accumulator 52 has a bellows 54 forming a portion of the housing and acting as a part of a spring element. A further part of the spring element is a tension spring 56 that is disposed inside the bellows 54, and that acts parallel to the bellows 54. The tension spring 56 is placed in tension as fluid is directed into the accumulator 52, and acts to urge the two rigid endwall sections of the accumulator 52 towards each other.

Another embodiment of a vehicle braking system pressure accumulator is generally indicated at 58 in FIG. 3b. The accumulator 58 is generally similar to the accumulator 52 illustrated in FIG. 3a, except a tension spring 60 thereof is outside of the housing formed partially by bellows 62, for example, surrounding the housing.

FIG. 4 illustrates an electronically controllable vehicle braking system for a motor vehicle according to the invention, which is indicated generally at 75. The braking system 75 includes a cylinder/piston arrangement 77. A brake pedal 79 is connected to the cylinder/piston arrangement 77 so that, by actuation of the brake pedal 79, brake fluid is provided from the cylinder/piston arrangement 77 to act on a brake 81 of the motor vehicle.

A pump arrangement 83 is provided, which is connectable with the cylinder/piston arrangement 77 and a pressure accumulator 85. The pressure accumulator 85 has a housing which comprises a fluid connection for a fluid flowing into and out of the housing and a spring arrangement against whose force brake fluid flowing through the fluid connection is acting. At least one part of the spring arrangement of the pressure accumulator 85 is formed by at least one part of the housing wall. Among the suitable embodiments of the pressure accumulator 85 are the pressure accumulators illustrated in FIGS. 2, 3a, and 3b, as discussed above.

What is claimed is:

1. A pressure accumulator comprising:
a rigid first wall section;
a rigid second wall section defining an opening therethrough;
a bellows defining an interior volume having a first end and a second end, said bellows being fixed to said first wall section to close said first end of said volume of said bellows, said bellows being fixed to said second wall section at said second end of said volume of said bellows about the opening through said second wall section;
a rigid first member having a first end and a second end, said first end of said first member being fixed to said first wall section, said first member extending partway through said interior volume toward said second wall section, said second end of said first member defining a first spring seating surface;

a rigid second member having a first end and a second end, said first end of said second member being fixed to said second wall section, said second member extending partway through said interior volume toward said first wall section, said second end of said second member defining a second spring seating surface; and a spring extending between said first spring seating surface and said second spring seating surface.

2. A pressure accumulator according to claim 1, wherein said first member comprises a rod having an enlarged head at said second end of said first member, said first spring seating surface comprising an annular portion of said head, said spring being a coil spring disposed about said rod.

3. A pressure accumulator according to claim 2, wherein said first plate defines a centrally disposed socket extending into said volume, said socket having interior threads, said rod having a threaded end engaging said interior threads of said socket to fix said rod to said first plate.

4. A pressure accumulator according to claim 3 wherein spring is compressed between said first and second spring seating surfaces, and wherein said rod may be rotated relative to said socket to adjust the compression on said spring.

5. A pressure accumulator according to claim 2, wherein said second member comprises a tubular sleeve disposed about said rod, said second member having a radially inwardly extending flange at said second end thereof, said second spring seating surface comprising annular portion of said flange, said flange having a radially inner edge defining an opening through which said rod extends.

6. A pressure accumulator according to claim 5, wherein said second member has an outwardly facing collar at said first end thereof, said second wall section defines a circumferential rim about said collar, and further including a retaining ring captured by said circumferential rim, said retaining ring engaging said collar to fix said second member to said second wall section.

7. A pressure accumulator according to claim 1, further including a second spring disposed outside of said interior volume of said bellows and engaging said first wall section, said spring and said second spring acting in parallel with said bellows.

8. A pressure accumulator according to claim 1 wherein said bellows is metal.

9. A pressure accumulator for a fluid system comprising:

a first wall section;

a second wall section defining an opening therethrough, said opening through said second wall being adapted for fluid communication with a fluid system;

a bellows fixed to said first and second wall sections to define a fluid accommodating volume, said bellows further acting as a spring connecting said first and second wall sections; and a spring disposed inside said fluid accommodating volume and operatively connecting said first and second wall sections, whereby said bellows and said spring act in parallel to resist movement of said first wall section away from said second wall section as fluid enters said fluid accommodating volume through said opening.

10. A pressure accumulator according to claim 9 wherein said bellows is metal.

11. A pressure accumulator according to claim 9 wherein said spring acts in compression to resist movement of said first wall section away from said second wall section.

12. A pressure accumulator according to claim 9 wherein said spring acts in tension to resist movement of said first wall section away from said second wall section.

13. A pressure accumulator according to claim 9 further including a second spring disposed outside of said interior volume of said bellows and engaging said first wall section, said spring and said second spring acting in parallel with said bellows to resist movement of said first wall section away from said second wall section.

14. A pressure accumulator, comprising:

a housing having a wall including two wall sections;

a fluid connection for fluid flowing into and out of said housing; and a spring arrangement against whose force fluid flowing through the fluid connection is acting, at least one part of said spring arrangement forming at least one part of said housing wall, a further part of the spring arrangement being formed by a spring element which urges said two wall sections towards each other, the further part of said spring arrangement acting parallel to the part of said spring arrangement which is formed by said housing wall.

15. A pressure accumulator according to claim 14 wherein the part of said spring arrangement which is formed by said housing wall is metal.

16. A pressure accumulator according to claim 14 wherein the part of said spring arrangement which is formed by said housing wall is a bellows arrangement.

17. A pressure accumulator according to claim 16 wherein said bellows arrangement is metal.

18. A pressure accumulator according to claim 14 wherein said spring arrangement acts in compression to urge said two wall sections towards each other.

19. A pressure accumulator according to claim 14 wherein said spring arrangement acts in tension to urge said two wall sections towards each other.

20. A pressure accumulator according to claim 14 further including a second spring disposed outside of said housing, said spring arrangement and said second spring acting in parallel to urge said two wall sections towards each other.

* * * * *